(12) United States Patent
Sreenivas et al.

(10) Patent No.: US 11,184,329 B2
(45) Date of Patent: Nov. 23, 2021

(54) PRIVACY NETWORK SYSTEM

(71) Applicant: Privacy Labs, Inc., Bellevue, WA (US)

(72) Inventors: Giridhar Sreenivas, Bellevue, WA (US); Derek Sigurdson, Bothell, WA (US)

(73) Assignee: PRIVACY LABS, INC., Bellevue, WA (US)

( * ) Notice: Subject to any disclaimer, the term of this patent is extended or adjusted under 35 U.S.C. 154(b) by 222 days.

(21) Appl. No.: 16/045,555

(22) Filed: Jul. 25, 2018

(65) Prior Publication Data

US 2020/0036678 A1  Jan. 30, 2020

(51) Int. Cl.
*H04L 29/06* (2006.01)
(52) U.S. Cl.
CPC ........ *H04L 63/029* (2013.01); *H04L 63/0236* (2013.01); *H04L 63/0272* (2013.01)
(58) Field of Classification Search
CPC .......................... H04L 63/029; H04L 63/0236; H04L 63/0272
USPC .......................................................... 726/13
See application file for complete search history.

(56) References Cited

U.S. PATENT DOCUMENTS

| | | | | |
|---|---|---|---|---|
| 9,137,211 | B2* | 9/2015 | Parla | H04L 63/0272 |
| 10,447,710 | B1* | 10/2019 | Li | H04L 63/0876 |
| 2006/0031407 | A1* | 2/2006 | Dispensa | H04L 61/25 |
| | | | | 709/219 |
| 2011/0026531 | A1* | 2/2011 | Deutsch | H04L 63/029 |
| | | | | 370/395.53 |
| 2011/0153793 | A1* | 6/2011 | Tan | H04L 63/0272 |
| | | | | 709/222 |

* cited by examiner

*Primary Examiner* — Thanhnga B Truong
*Assistant Examiner* — Angela R Holmes
(74) *Attorney, Agent, or Firm* — Christensen O'Connor Johnson Kindness PLLC (57) ABSTRACT

Disclosed is a system for deploying a secure server that provides one or more network services. Generally stated, a secure server is deployed in a secure environment behind a privacy barrier. The secure server is configured to interact with a service host on a public network outside the privacy barrier. The service host facilitates routing information from the public network through the privacy barrier to the secure server.

10 Claims, 8 Drawing Sheets

PRIVACY NETWORK SYSTEM

CROSS REFERENCE TO RELATED APPLICATIONS

This patent application does not claim priority to any other patent filing.

BACKGROUND INFORMATION

Use of computing devices to consume various web-based or Internet-based services, such as email, has become ubiquitous. Some Internet-based services, such as social media, boast subscriber numbers exceeding a billion users. For this reason, very many people have become dependent upon the use of publicly available network services.

However, with such ubiquitous and public use comes a significant trade-off. More and more, users are expressing discomfort with how much personal information is being collected, stored, and shared by the providers of many network services. The number of instances of data breaches involving network service providers is ever increasing in both frequency and severity. These data breaches expose users of those services to the disclosure of personal information.

For example, one provider of a free email service may boast in excess of a billion users. Because that provider houses the email accounts for so many users, it may be under constant attack by hackers with malicious intent. Users of that provider's service trust it to employ good security procedures. But even the best security may eventually fail under constant siege.

Some argue that the solution to constant attack is for the provider to employ better security. However, an even better solution is to avoid using that provider all together. In other words, if one's email was never stored by provider, then whether the provider's security measures are breached becomes irrelevant.

More and more, individuals realize a need to privatize their personal data. An adequate system that enables an individual to privatize certain network services that would otherwise be vulnerable to large-scale cyber-attacks has eluded those skilled in the art, until now.

SUMMARY OF EMBODIMENTS

This disclosure is generally directed to a privacy network having a secure server that provides one or more network services. Generally stated, the secure server is deployed in a secure environment behind a privacy barrier. The secure server is configured to interact with a service host on a public network outside the privacy barrier. The service host facilitates routing information from the public network through the privacy barrier to the secure server.

DETAILED DESCRIPTION

This disclosure teaches a system for deploying a secure server that provides one or more network services. Generally stated, a secure server is deployed in a secure environment behind a privacy barrier. The secure server is configured to interact with a service host on a public network outside the privacy barrier. The service host facilitates routing information from the public network through the privacy barrier to the secure server.

Various embodiments are described more fully below with reference to the accompanying drawings, which form a part hereof, and which show specific exemplary implementations for practicing this disclosure. However, other embodiments may be implemented in many different forms and should not be construed as limited to the embodiments set forth herein; rather, these embodiments are provided so that this disclosure will satisfy formal statutory requirements. Embodiments may be practiced as methods, systems, or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on various considerations, such as performance requirements of the computing system implementing the embodiment. Accordingly, the logical operations making up the embodiments described herein may be referred to alternatively as operations, steps or modules.

Figure 1:
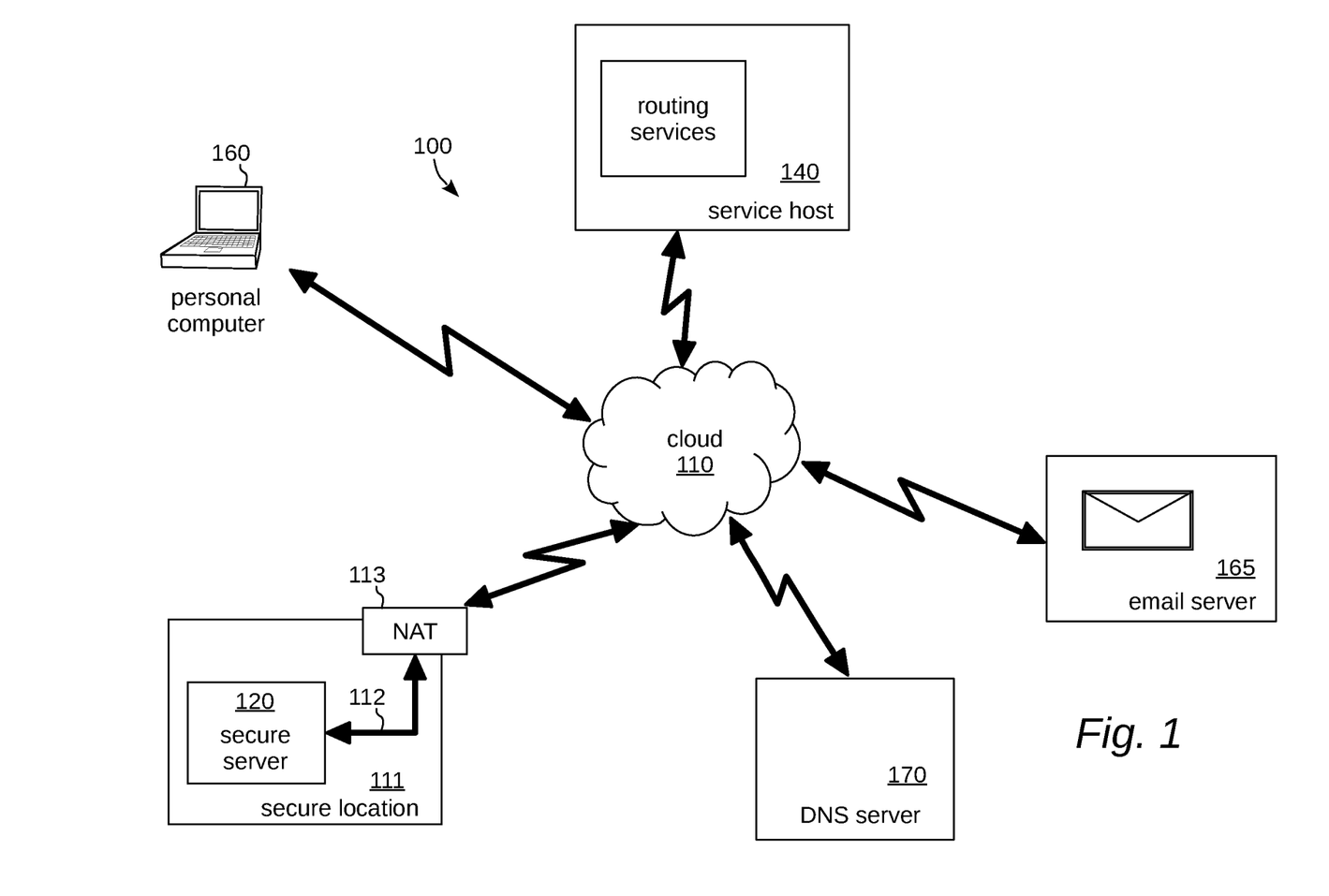
FIG. 1 is a conceptual overview of a network environment in which is deployed a privacy system in accordance with this disclosure

Turning now to the drawings, FIG. 1 is a conceptual overview of a network environment 100 in which is deployed a privacy system in accordance with this disclosure. The network environment 100 generally includes networking components and facilities to enable disparate computing systems to communicate and interoperate. Individual components of the network environment 100 communicate over a publicly accessible wide area network (public network 110), sometimes referred to as a "cloud" or the Internet.

The privacy system is generally embodied in two components—a secure server 120 and a service host 140—that communicate with each other and other computing devices over the public network 110.

The secure server 120 is deployed in a secure location 111 that has a private network 112. The private network 112 typically isolated from the public network 110 by a privacy boundary 113, such as a network address translation (NAT) gateway (e.g., a router). The secure server 120 connects through the privacy boundary over the public network 110 to the service host 140.

Figure 2:
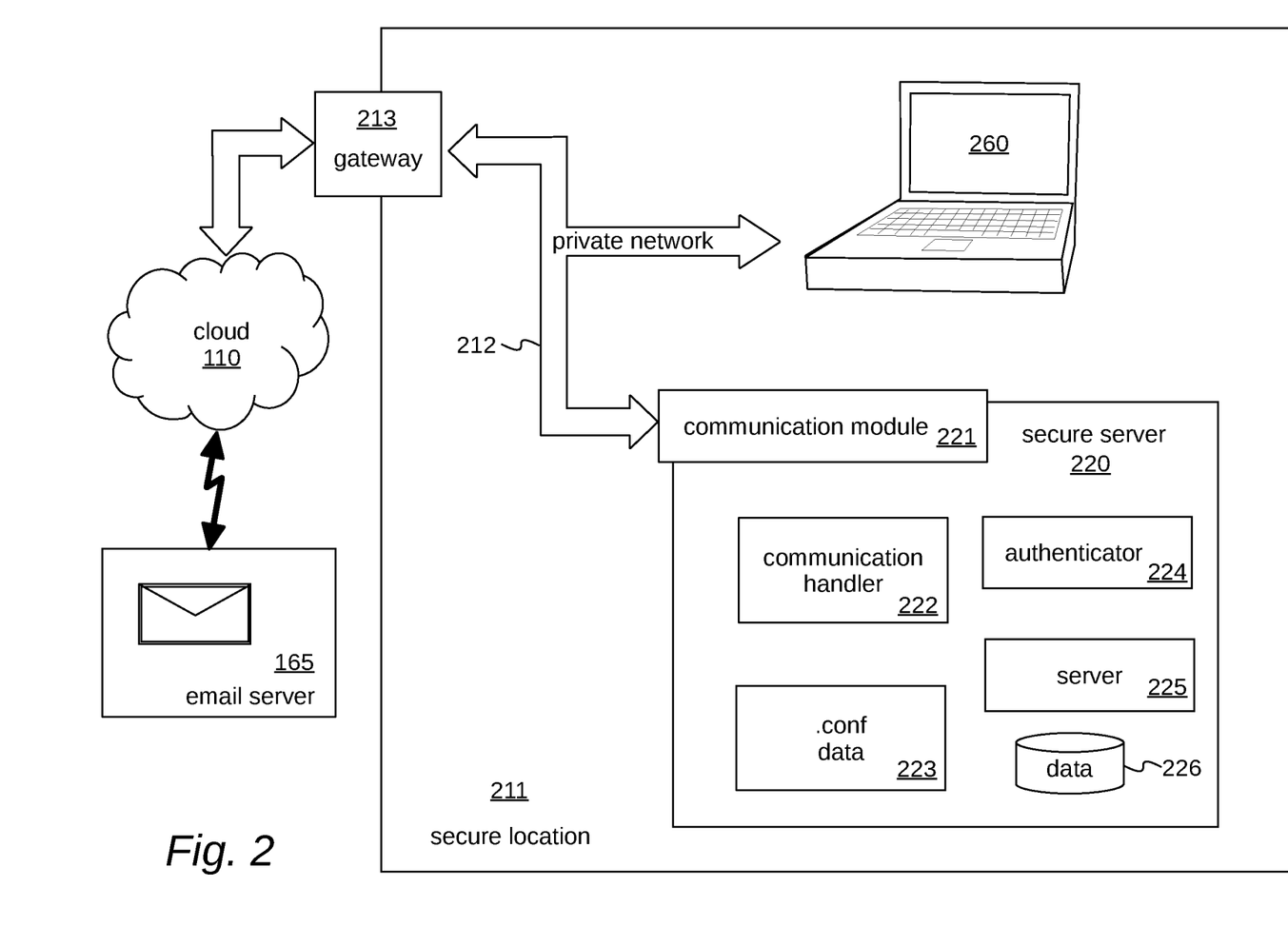
FIG. 2 is a functional block diagram of a preferred embodiment of a secure server deployed in a secure location.

In accordance with this disclosure, the secure server 120 makes available a "network service" that is hosted from within the secure location 111. For the purpose of this disclosure, the term "network service" means any computer-to-computer communication over a network for the purpose of providing information, resources, functionality, or applications resident on one computer (a server or host) to another computer (a client). In some instances, the same computer may be both the host of one network service and a client of another network service. It should further be noted that, in some instances, a network service may still be offered from a host computer to a client computer even if the host and client are performing some manner of collaborative or distributed computing environment. One particular embodiment of a secure server 120 is illustrated in FIG. 2 and described below.

Figure 3:
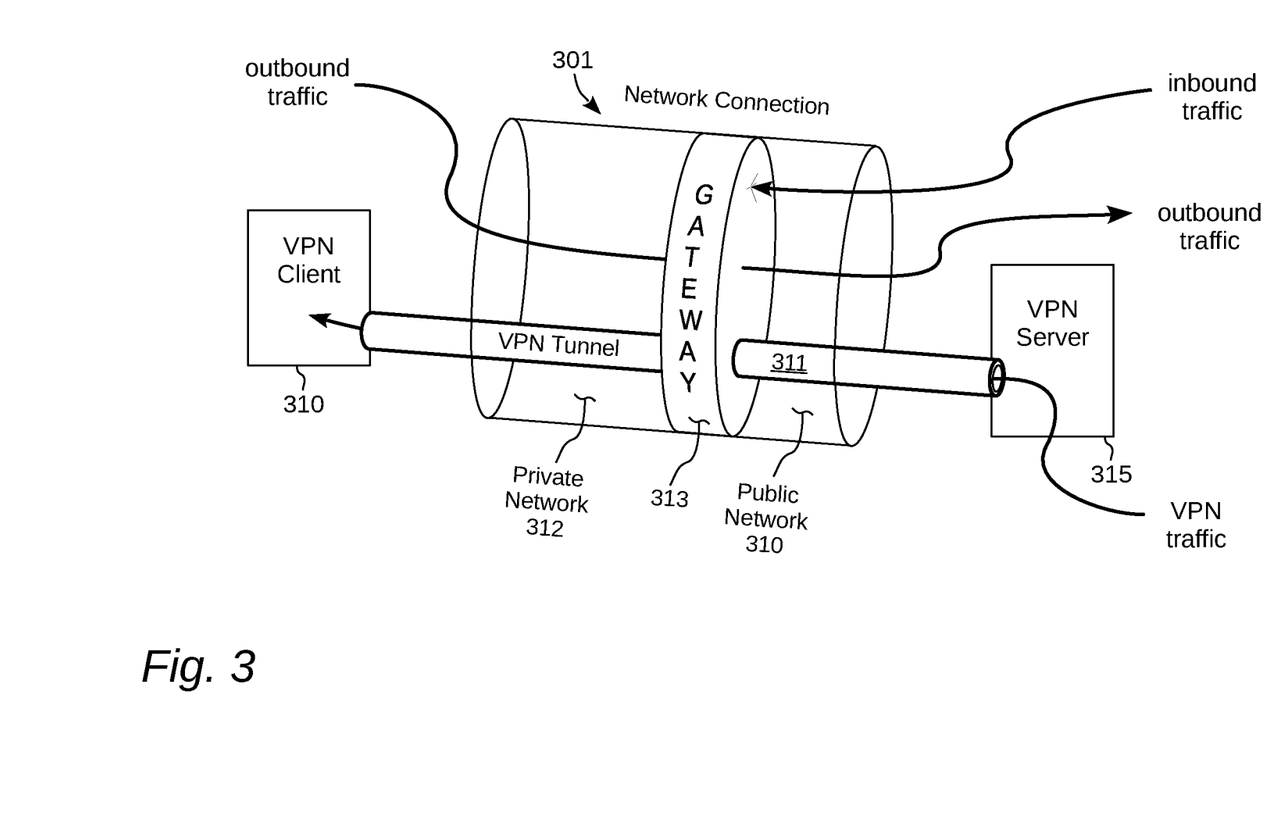
FIG. 3 is a conceptual illustration of the operation of a secure private tunnel, in accordance with embodiments of the disclosure.

The service host 140 is a specially configured computing system accessible over the public network 110. The service host 140 provides routing services to the secure server 120 so that requests for the network service may be routed to the secure server 120 through the privacy boundary 113. In most embodiments, the service host 140 accomplishes such routing by acting as an endpoint for a secure tunnel from the secure server 120 through the privacy boundary 113 to the service host 140. One particular embodiment of a service host 140 is illustrated in FIG. 3 and described below.

In addition to the components of the privacy system, many other components are depicted in the network environment of FIG. 1. For instance, a personal computer 160 is shown that may be connected to the public network 110. The personal computer 160 is merely representative of any computing device that may be used to access the public network 110. For example, the personal computer 160 may be a laptop or desktop computer connected to the public network 110. Alternatively, the personal computer 160 may be a mobile device, such as a cellular telephone or tablet computer having data access to the public network, perhaps via an intermediate cellular network. Personal computer 160 is merely representative of any manner of computing device that communicates over the public network 110 with other computing devices.

The personal computer 160 of the preferred embodiment is configured to take advantage of one or more network services offered over the public network 110. For example, the personal computer 160 may include browser software for visiting web pages served up by a web server over the public network 110. Similarly, the personal computer 160 may include email client software for sending and receiving email through an email server 165 connected to the public network 110. Still further, the personal computer 160 may include file synchronization software that operates to synchronize data files on the personal computer with a file hosting server connected to the public network 110. Yet even further, the personal computer 160 may include file transfer software that enables non-synchronized file transfer to any manner of resource server connected to the public network 110.

An email server 165 is shown which provides email services to various users. The email server may implement one or more communications protocols that are common in the industry, such as the Simple Mail Transfer Protocol (SMTP), Internet Message Access Protocol (IMAP), Post Office Protocol (POP), Messaging Application Program Interface (MAPI), Exchange ActiveSync (EAS), or the like.

A Domain Name System (DNS) server 170 operates in the network environment 100 to provide domain name resolution services. As is known in the industry, particular sites on the Internet are generally identified by domain names but are accessed by computing systems using Internet Protocol (IP) addresses. Domain names provide a simple, human-readable mechanism for identifying a site or location on the Internet. However, at the machine level, communication occurs between any two components over the Internet using numeric addresses. The DNS server 170 includes mappings of domain names to IP addresses. In this way, any component that seeks to address another component over the Internet by domain name makes a call to a DNS server (e.g., DNS server 170) to resolve that domain name to its corresponding IP address. Then the corresponding IP address may be used to route IP packets to the particular component having that IP address. DNS servers are well known in the art.

In operation, various computing devices communicate over the public network 110 to exchange data. For instance, the personal computer 160 may communicate with the email server 165 over the public network 110 to check an email account. Similarly, the email server 165 may communicate with the DNS server 170 to resolve domain names associated with other email servers, for instance, to deliver email.

FIG. 2 is a functional block diagram of a preferred embodiment of a secure server 220 deployed in a secure location 211. The secure location 211 may be any physical location at which a user exercises a sufficient amount of control that access to the secure location 211 is limited. Very common examples of the secure location 211 include the user's house, apartment, or workplace. Many other examples will become apparent to those skilled in the art in view of this disclosure. The secure location 211 represents any area where the user has an expectation of privacy.

In many embodiments, a private network 212 is implemented within the secure location 211. The private network may be a wired network (e.g., ethernet), a wireless network (e.g., WiFi), or some combination of wired and wireless networks. Computing devices within the secure location 211 communicate with each other over the private network 212. Because the private network 212 is within the secure location 211, computing devices connected to the private network 212 may enjoy a heightened level of trust with each other. Likewise, because access to the private network 212 is somewhat controlled, the user may have a lower fear of security breaches than for computing devices deployed on the public network 110.

The private network of this disclosure also includes a gateway 213 between the private network 212 and the public network 110. The gateway 213 could also take the form of, or be incorporated into, another network component, such as a router or perhaps a modem (e.g., a DSL or cable modem). Although such a gateway may provide many services, most relevant to this discussion is Network Address Translation (NAT).

Generally stated, NAT involves the gateway 213 handling network traffic between any computing device on the private network 212 and any computing device on the public network 110. In essence, the gateway 213 assigns a private IP address to each computing device on the private network 212. The gateway 213 also has a public IP address on the public network 110. Network traffic initiated by a computing device on the private network 212, such as personal computer 260, to another computing device on the public network 110, such as email server 165, is routed by the gateway 213.

In other words, network traffic initiated by, for example, the personal computer 260 and intended for the email server 165 is presented to the gateway 213 for delivery. The gateway 213 forwards that network traffic to the email server 165 using the gateway's public IP address as the originating IP address. The email server 165 then responds to the gateway 213 using the gateway's public IP address. The gateway 213 maintains state information which it may then use to route the response from the email server 165 back to the personal computer 260. However, the email server 165 is not made aware of the personal computer's IP address on the private network 212.

By performing NAT, the gateway 213 isolates network traffic on the private network 212 from network traffic on the public network 110. Typically, computing devices on the public network 110 may not discover private IP addresses for any computing devices on the private network 212; rather, only the gateway 213 has a publicly addressable IP address. The only network traffic that may be sent directly to a computing device on the private network 212 is in response to a network session initiated from within the private network 212. There are exceptions to this rule, but those exceptions are atypical and difficult for a layperson to implement.

NAT acts as an effective bar to inbound unsolicited network traffic. For this reason, NAT is a very effective security measure. Generally speaking, malicious elements cannot target computing devices on the private network 212 unless those computing devices initiate a network session with those malicious elements. However, absent the teachings of this disclosure, NAT also operates to prevent a computing device on the private network from offering a network service on the public network 110 where unsolicited inbound network traffic would be expected.

Another common feature of gateways that renders it difficult to host a server within the private network 212 is dynamic IP addressing. Generally stated, IP addresses assigned to network hardware can be either dynamic or static. Static IP addresses do not change over time so network services hosted at those IP addresses can be reliably located by consumers of those network services (e.g., email clients, email servers, file synchronization software, or the like). However, if a network service server has an IP address that changes over time, as is the case with dynamic IP addresses, that server cannot be reliably located from session to session. Dynamic IP addresses are the norm with non-commercial and personal private networks. In this particular embodiment, the gateway 213 has a dynamic public IP address that changes over time.

Also illustrated in FIG. 2 is a secure server 220. The secure server 220 is a special purpose computing device configured to host and serve some network service, such as an email service, a file hosting or synchronization service, a music streaming service, or the like.

The secure server 220 may include a number of components which cooperate to provide the network service. In one specific embodiment, the secure server 220 includes a communication module 221, a communication handler 222 with configuration data 223, an authenticator module 224, a server component 225, and a data store 226.

The communication module 221 of the secure server 220 enables bidirectional network communication between the secure server 220 and other computing devices over a network. The communication module may be configured to communicate using any appropriate network protocol, such as Ethernet, 802.11, or the like. The communication module may include a wired connection, wireless connection, or both. The communication module 221 is configured to establish and maintain an ordinary communication link between the secure server 220 and other computing devices through the private network 212.

The server component 225 operates to host and serve the network service specific to the secure server 220. For example, if the secure server 220 is configured as a web server, the server component 225 may be web server software, such as Apache or the like. Alternatively, if the secure server 220 is configured as an email server, the server component may be email hosting software, such as Postfix or the like. In yet another alternative, if the secure server 220 is configured as a file synchronization server, the server component may be a file synchronization host, such as OwnCloud or the like. Many other examples of types of services that may be provided by the server component will be apparent to those skilled in the art.

The data store 226 represents a storage location in which may be stored data that is served by the server component 226. For instance, if the server component 225 provides an email service, the data store 226 may contain email messages and configuration data.

Authentication for the secure server 220 may be performed by an authentication component 224. It will be appreciated that access to data hosted by the secure server 220 may be protected by various access restriction mechanisms, such as user ID/password pairs. More sophisticated access restriction mechanisms may also be employed. The authentication component 224 is configured to authenticate access to data on the secure server 220.

In accordance with this disclosure, the communication handler 222 is specially configured to enable access to the secure server 220 from the public network 110 in cooperation with a service host. For instance, the communication handler 222 may include special purpose components that initiate or establish a secure link, such as a virtual private network (VPN), over an otherwise ordinary network connection, such as a TCP or UDP connection. In one specific embodiment, the communication handler 222 includes a VPN client that is configured, via configuration data 223, to initiate a VPN tunnel between the secure server 220 and a remote service host over an ordinary communication link established by the communication module 221. As will be appreciated by those skilled in the art, a VPN tunnel operates to functionally connect two different networks (or computing devices) in such a manner that one network (or computing device) operates as if it were in fact connected directly to the other network.

By way of illustration, and turning briefly to FIG. 3, a first (local) network environment (private network 312) is shown connected to a second (remote) network (public network 310) over an ordinary communication link (represented as "network connection 301"). In this example, network traffic from the private network 312 to the public network 310 is referred to as "outbound" traffic. Conversely, network traffic from the public network 310 to the private network 312 is referred to as "inbound" traffic.

A gateway 313 is used to negotiate traffic between the private network 312 and the public network 310. Outbound traffic may generally flow freely from the private network to the public network through the gateway 313, but unsolicited inbound traffic is prevented by the gateway 313. As noted above, a number of mechanisms operate either individually or in combination to stop inbound traffic, such as NAT or a firewall. In addition, the IP address of the gateway 313 on the public network 310 may change from time to time, rendering it difficult to reliably locate the private network 312, such as with a domain name.

A VPN client 310 within the first network establishes an end-to-end communication link, called a tunnel 311, between the VPN client and a VPN server 315 (sometimes referred to as a Remote Access Server or RAS) on the public network 310. The tunnel 311 is established over an existing ordinary communication link 301, such as an ordinary Internet connection. The VPN client 310 and VPN server 315 cooperate to essentially create a persistent connection between the VPN client 310 and the VPN server 315 that simulates a direct network connection. In other words, while connected, the VPN client 310 is functionally just another node on the same network as the VPN server 315.

In addition, because the tunnel 311 is insulated from the ordinary communication link, and because the VPN client 310 initiates the tunnel 311 from within the private network 312, the tunnel 311 overcomes the limitations imposed by both NAT and firewalls. In other words, network traffic (e.g., VPN traffic) intended for the VPN client 310 may be routed to the VPN server 315 rather than the gateway 313. The VPN server 315 then reroutes that VPN traffic to the VPN client 310 over the tunnel 311 rather than through the ordinary communication link 301. In this way, the gateway 313 does not interfere with unsolicited inbound traffic (e.g., VPN traffic). In addition, the IP address of the gateway 313 can freely change without impacting traffic flowing from the VPN server 315 to the VPN client 310.

Returning now briefly to FIG. 2, the communication handler 222 of the preferred embodiment of the secure server 220 implements a VPN client which is configured, via configuration data 223, to establish a VPN tunnel through the gateway 213 to a VPN server hosted by a remote service host. Because the communication handler 222 initiates the tunnel connection from within the private network 212, the gateway 213 does not block traffic on that connection. In addition, once the tunnel is established, the secure server 220 is in effect just another node on the same network as the remote service host, e.g., the public network 110.

Figure 4:
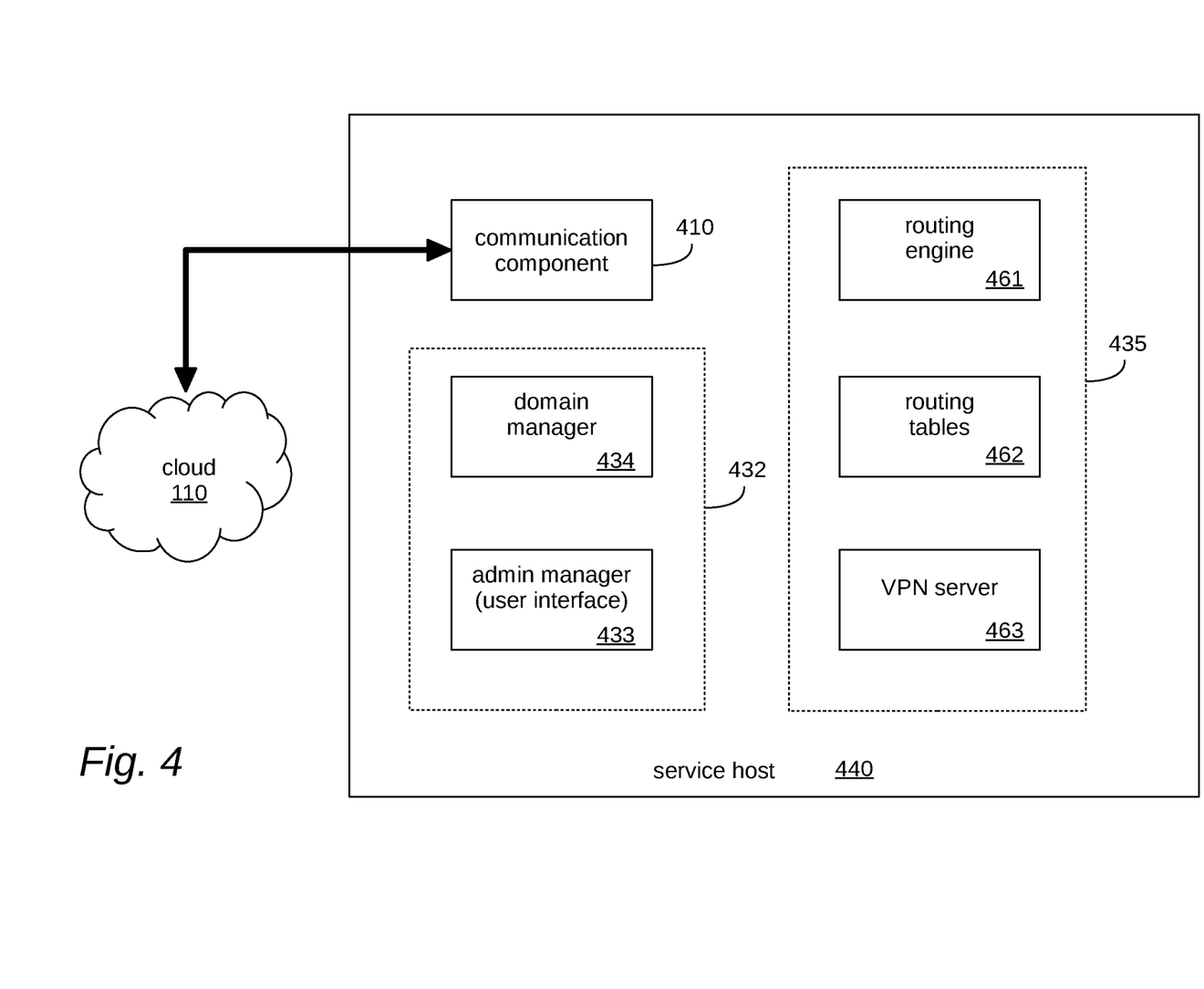
FIG. 4 is a functional block diagram of a preferred embodiment of a service host in accordance with this disclosure.

FIG. 4 is a functional block diagram of a preferred embodiment of a service host 440 in accordance with this disclosure. The service host 440 may execute in a virtual computing system or in an actual dedicated computing device. In addition, the functions of the service host 440 may be implemented on a single computing system or be distributed over multiple computing systems, such as for redundancy, load balancing, localization, or the like.

In one preferred embodiment, the service host 440 includes a communication component 410 and at least a portal component 435. The communication component 410 is configured to provide ordinary network connectivity, such as by establishing a TCP or UDP connection with other computing devices over an Ethernet communication link, or the like. In the preferred embodiment, the communication component 410 connects the service host 440 to a public network 110, such as the Internet. In addition, the communication component 410 of the preferred embodiment has a static IP address on the public network 110, which does not change unpredictably. For that reason, the service host 440 may be reliably accessed by other computing devices over time.

In the preferred embodiment, the portal component 435 is configured to provide a routing service for a secure server operating within a private network (e.g., secure server 220). The portal component 435 of the preferred embodiment includes a VPN server 463, a routing engine 461, and routing tables 462. The VPN server 436 is a component that provides an endpoint for a VPN tunnel that may be established by a remote VPN client (e.g., VPN client 310). By acting as the endpoint of a VPN tunnel, the VPN server 436 may operate to effectively couple the remote VPN client (e.g., VPN client 310) to the same network (e.g., the public network 110) to which the service host 440 is connected.

The service host 440 may service multiple customers, each customer hosting its own secure server. Therefore, the VPN server 436 may host a different VPN tunnel for each subscribed customer. The result may be multiple simultaneously hosted VPN tunnels. To address that situation, the portal 435 may include a routing engine 461 that maintains routing tables 462. The routing engine 461 may direct network traffic to particular VPN tunnels established by each of the different VPN clients. In one embodiment, the routing tables 462 include information that maps customers to current VPN tunnels. In that way, persistent configuration information for each customer can be easily mapped to the current instance of a VPN tunnel associated with that customer.

In various embodiments, the service host 440 may also include a management component 432 with an admin manager 433 and a domain manager 434. In one preferred embodiment, the admin manager 433 may provide a user interface to enable a user to administer several features or functions of the service host 440. For instance, the admin manager 433 may allow a customer to access account information about the customer's account, such as perhaps domain information, billing information, contact information, options for service features, options pertaining to any service the remote secure server may offer, and the like. The admin manager 433 may be implemented as a web-based admin dashboard, it may expose an Application Programming Interface (API) to enable administrative management from a remote device, or the like.

The management component 432 of a preferred embodiment may further include a domain manager 434. In one implementation, the domain manager 434 is configured to create or alter domain name records for certain domain names. For instance, if a new customer of the service host 440 desires a domain name to be used in association with the customer's particular secure server, the domain manager 434 may acquire such a domain name on behalf of the customer as part of a provisioning process or function. Alternatively, if the new customer has an existing domain name that the customer desires to use with a new secure server, the domain manager 434 may alter domain name records associated with the existing domain name to facilitate use of the existing domain name with the service host.

Figure 5:
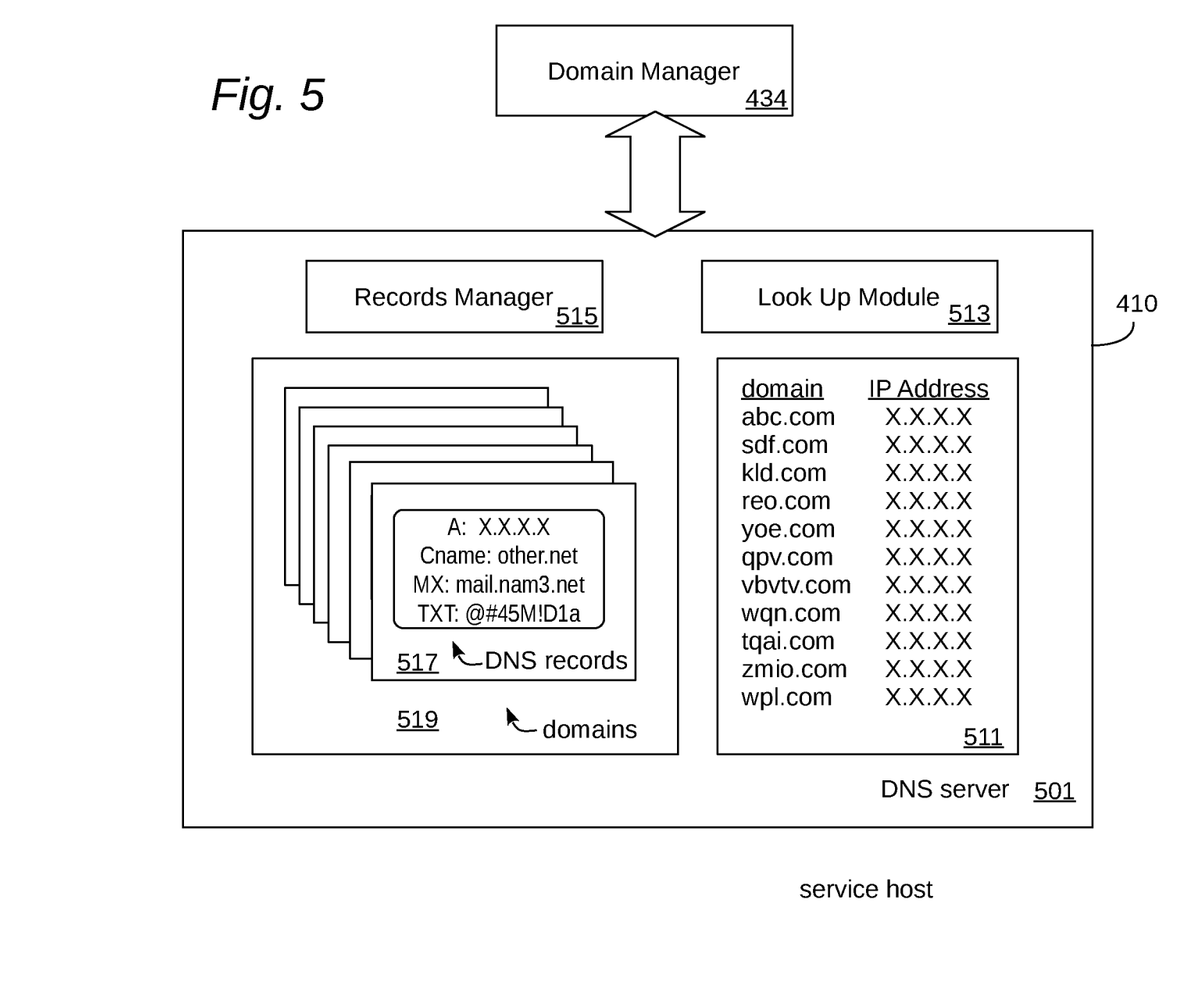
FIG. 5 is a conceptual illustration of an interaction between a domain manager, in accordance with this disclosure, and a domain name server.

Turning now briefly to FIG. 5, it will be appreciated by those skilled in the art that the domain manager 434 may be configured to interact with a DNS server (frequently referred to as a "name server"). As noted above, a DNS server is a repository of information about domain names. In many embodiments, the DNS server 501 implements the equivalent of a lookup table 511 that includes a mapping of domain names to their associated IP addresses. Through the use of a lookup module 513, other computing devices may query the DNS server 501 for IP addresses associated with a particular domain name.

In addition to the DNS lookup function, the DNS server 501 may also include a records manager 515 that is configured to administer DNS records 517 for one or more domains 519. As is known in the industry, a domain may have a number of associated DNS records. For example, a domain may have "A" records, which point the domain or a subdomain to a particular IP address; "CNAME" records, which specify alias domain names; "MX" records, which identify a mail server to handle email messages directed to the domain, and other types of DNS records. The records manager 515 is responsible for creating and/or editing each of the several DNS records 517 for each of the domains 519.

In one preferred embodiment, the domain manager 434 is configured to interact with one or both of the lookup module 513 and the records manager 515. For example, the domain manager may interact with the lookup module 513 for the purpose of identifying IP addresses for domain names, such as in response to HTTP queries. In another example, the domain manager may interact with the records manager 515 for the purpose of creating, altering, or perhaps deleting DNS records for one or more domains.

In one preferred embodiment, the domain manager 434 is configured to interact with the records manager 515 to create new DNS records for a domain associated with a secure server. For instance, if the secure server is an email server intended to be hosted by a user at the "example.com" domain, the domain manager 434 may interact with the records manager 515 to create an MX record indicating that email messages intended for the example.com domain should be handled by a server having, for example, the mail.example.com fully qualified domain name. In addition, the domain manager 434 may further cause the records manager 515 to create an A record that points the mail.example.com subdomain to a particular IP address at which can be found the secure server. Alternatively, the records manager 515 may modify existing DNS records to reflect the desired settings.

Returning now to FIG. 4, the management component 432 may be further configured to secure a new domain name for a customer. For instance, as part of an initial setup or provisioning process, the admin manager component 433 may prompt a customer with an option to use the customer's existing domain name, to use a domain name provided by the service host 440, or to secure a new domain name for use with a secure server. For those customers who choose to use an existing domain name (either the customer's or one provided by the service host 440), the domain manager 434 may perform operations as described in conjunction with FIG. 5 to create or edit existing DNS records. In situations where the customer desires to secure a new domain name, the management component 432 may programmatically interact with one or more domain name registrars to acquire a new domain name on behalf of the customer. At that point, the management component 432 may perform operations to create or edit DNS records 517 for the new domain name as just described in conjunction with FIG. 5.

Figure 6:
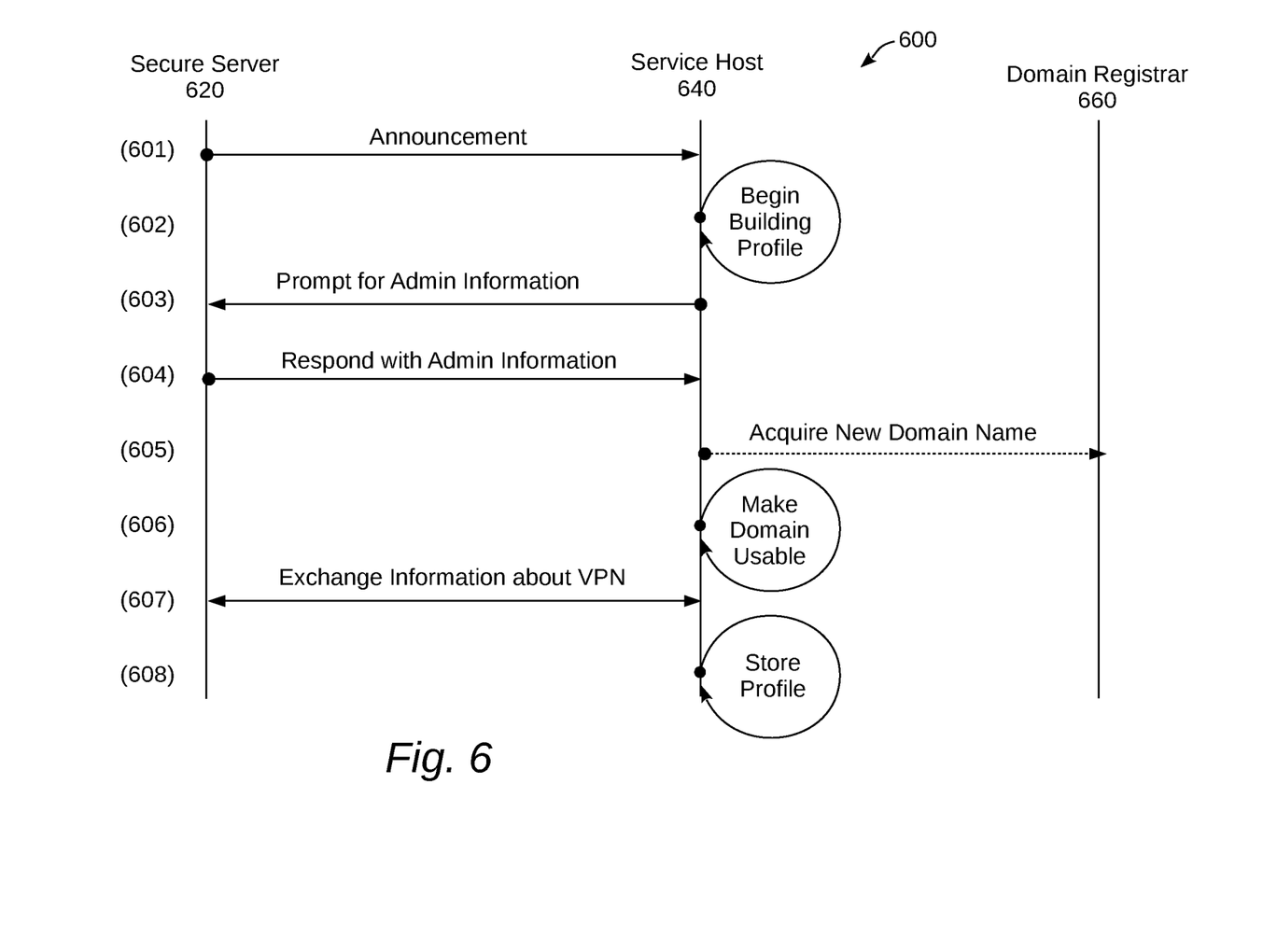
FIG. 6 is a conceptual flow diagram of a preferred method of provisioning a domain name for a secure server by a privacy system, in accordance with this disclosure.

Turning now to FIG. 6, a preferred method of provisioning a domain name for a secure server 620 by a privacy system is shown and will be described in conjunction with the components of FIG. 1. The provisioning process 600 may be performed by a privacy system including a secure server 620 and a service host 640 to establish a trust relationship between them. The secure server 620 may be configured to host a network service that benefits from access over a public network 110. However, the secure server 620 is deployed on a private network 612.

The provisioning process 600 begins when the secure server 620 is initialized at step 601. At this stage, the secure server 620 has not yet established a trust relationship with the service host 640. For example, the secure server 620 may be brand new and not yet put into service. In another example, the secure server 620 may have undergone a significant upgrade or restoration and require provisioning again.

The provisioning process 600 begins at step 601, where the secure server 620 is first started or otherwise put into service initially. Alternatively, the secure server 620 may provide an option for re-provisioning simply because the customer desires it. The secure server 620 begins by sending a communication to a service host to announce that the secure server 620 is ready for service. The secure server 620 may be pre-configured with contact information for the service host 640 or the secure server 620 may prompt the customer for that contact information.

Once the secure server 620 has announced itself to the service host, at step 602 the service host begins to build a profile for the secure server 620. For example, the service host 640 may assign a static IP address to the profile for the secure server 620.

At step 603, the service host 640 may prompt the secure server 620 for information to include in the profile. For instance, the service host 640 may prompt the secure server 620 for information about whether to use an existing domain name, to use a domain name controlled by the service host 640, or perhaps to acquire a new domain name. The service host 640 may additionally prompt the secure server 620 for account or billing specific information, such as, perhaps, a payment method should the customer be purchasing a premium service, or the like.

At step 604, the secure server 620 responds to the service host 640 with whatever information has been requested. For example, the secure server 620 may return domain information about whether to use an existing domain or to acquire a new domain. If an existing domain is to be used, the secure server 620 may provide credentials associated with a DNS management account for that domain. Alternatively, the secure server 620 may respond that a new domain name is desired and instruct the service host to acquire the new domain name.

If the secure server 620 indicates that a new domain name is desired, at step 605 the service host performs a set of operations to acquire a new domain name on behalf of the secure server 620. It should be appreciated that several interactions between the service host 640 and the secure server 620 may be necessary to complete the acquisition of the new domain name. For instance, the service host 640 may prompt the secure server 620 for contact information and payment information to complete the acquisition of the new domain name. In addition, the service host 640 may also interact with a third party, such as a domain name registrar 660, to acquire the new domain name.

If the secure server 620 indicates that an existing domain name is to be used, or after a new domain name has been acquired, at step 606 the service host 640 may perform several operations to make the existing domain name usable with the service. For instance, the service host may create new DNS records to point the domain name to the IP address associated with the secure server 620. In one specific example, if the secure server 620 provides email service, the service host 640 may create new MX records to indicate that the secure server 620 handles email messages for the domain name. In another example, if the secure server 620 is configured to provide file synchronization services, the service host 640 may create new A records to point other TCP traffic to the secure server 620. Many other alternatives will become apparent to those skilled in the art.

At step 607, the secure server 620 and the service host 640 may exchange information sufficient to establish a secure connection, such as a VPN tunnel, between the two. For example, the service host 640 may transmit to the secure server 620 (or vice versa) a secure code, such as a token or digital certificate or key, that may be used to establish a VPN tunnel between the secure server 620 and the service host 640.

As part of the provisioning process, the service host 640 writes information to the profile that describes the secure server 620. For example, the information obtained from the secure server 620 at step 604 may be stored in the profile. In addition, the domain name and a public IP address associated with that domain name may be stored in the profile. Still further, the secure code(s) exchanged at step 607 may be stored in the profile. Billing information, if applicable, may also be stored in the profile.

Once the secure server 620 and the service host have undergone the provisioning process 600, the secure server 620 is accessible from other computing devices using the domain name and IP address set up for the secure server 620. Accordingly, any network service offered by the secure server 620 is available over the public network.

Figure 7:
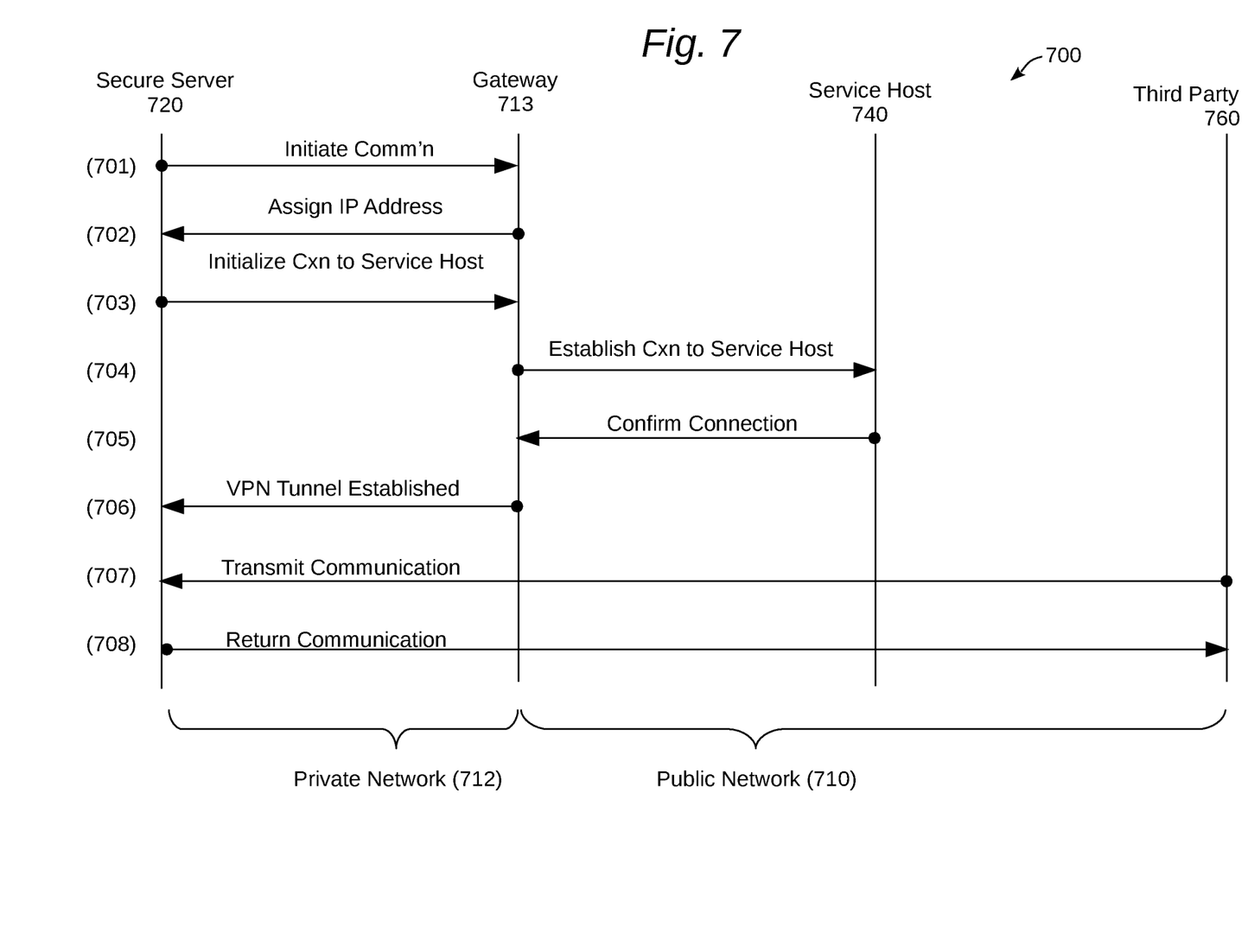
FIG. 7 is a conceptual flow diagram of a preferred method for initializing a secure server for use in a privacy system, in accordance with this disclosure.

Turning now to FIG. 7, a preferred method 700 for initializing a secure server 720 for use in a privacy system is shown and will be described in conjunction with the components of FIG. 1. The method 700 begins when the secure server 720 is being put into use, such as when it is being powered on. In accordance with this embodiment, the secure server 720 is a computing device configured to provide a network service to other computing devices connected to a public network 710.

At step 701, the secure server 720 acquires an IP address so that it may communicate with other computing devices on a private network. As is known in the industry, the secure server may implement a Dynamic Host Configuration Protocol (DHCP) client that requests a dynamic IP address from a DHCP server that is responsible for administering dynamic IP addresses on the private network 712. To do so, the secure server 720 initiates a communication with a local gateway 713 to request an IP address.

At step 702, the local gateway 713, which may implement a DHCP server, responds to the secure server request by returning a dynamic IP address to the secure server 720. The dynamic IP address enables the secure server 720 to communicate with other computing devices on the private network 712.

It will be appreciated that both steps 701 and 702 may be avoided if the secure server 720 is pre-configured with a static IP address on the private network 712 rather than a dynamic IP address. In such embodiment, the secure server 720 may, but need not, omit the DHCP client, and the local gateway 713 may, but need not, omit the DHCP server.

At step 703, the secure server 720 initializes a secure connection to a service host 740. In one preferred embodiment, the secure server 720 may implement a VPN client that initializes a VPN tunnel to the service host 740. In many embodiments, the local gateway 713 isolates the private network 712 from the public network 710 through NAT. Accordingly, the secure server 720 initializes the connection to the service host 740 by first communicating with the local gateway 713.

At step 704, the local gateway 713 passes the secure server's connection request to the service host 740. The connection request may include data sufficient to authenticate the secure server 720 to the service host 740.

At step 705, in response to the secure server request, service host 740 accepts the VPN tunnel and returns confirmation of that acceptance to the local gateway 713, which in turn returns that confirmation to the secure server 720 at step 706.

At this point, the VPN tunnel has been established. The service host 740 may then associate the endpoint of the VPN tunnel with a public IP address. In this way, network traffic targeted at the public IP address may be routed directly to the secure server 720 over the VPN tunnel.

A third party 760 may direct communications to the secure server 720 using a domain name which resolves to the public IP address provided by the service host 740. Accordingly, messages targeted at the domain name go to the IP address identified by the service host 740. The service host 740, in turn, routes the traffic directed to that domain name or IP address to the secure server 720.

Because the secure server 720 and the service host 740 are connected by a VPN tunnel, the local gateway 713 does not block traffic from the service host 740 to the secure server 720. In this way, the NAT feature of the local gateway 713 does not prevent inbound traffic directed to the secure server 720 from random computing devices on the public network 110.

To illustrate the point, at step 707 the third party 760 issues a communication directed to the secure server 720. For example, the secure server 720 may implement an email service. In such a case, the third party 760 may issue a request to check an email account, for example. Alternatively, the third party 760 may transmit an intent to deliver an email message either to the secure server 720 or using the secure server 720 as an outbound email server. Because of the VPN tunnel between the service host 740 and the secure server 720, the communication from the third party 760 is routed directly to the secure server 720. The service host 740 merely operates as another "hop" in the network traffic.

At step 708, the secure server may then issue a response message directly to the third party 760. In one example, the secure server 720 may implement an email server. In such a case, the third party 760 may be another email server attempting to deliver email messages to or retrieve email messages from the secure server 760. In another example, the secure server 720 may implement a file synchronization service. In such a case, the third party 760 may be a remote user of the file synchronization service connecting to the secure server 720 to send or receive data file changes, or the like.

As has been shown, the disclosure is directed to a privacy system in which a secure server provides a network service from behind a privacy boundary. The service host enables and facilitates public access to the secure server. The service host may perform one or more of a number of operations to accomplish this, such as securing domain names on behalf customers, securing static, public IP addresses for use in providing network services, automating the process of setting up domain name records for one or more customer domains, hosting an endpoint for a secure tunnel from a customer's secure server, and establishing a route for traffic from external third parties to the customer's secure server.

Embodiments of the foregoing disclosure may be implemented using one or more computing devices. The computing devices in which embodiments are implemented may take one or more of several different configurations. For instance, physical computing hardware may be used as well as virtual computing environments. In addition, both fixed location and mobile devices may be used. Any combination of computing devices may be used to implement embodiments. However, once implemented, the embodiments of this disclosure transform the host computing device into a special purpose machine specially configured to accomplish the goals of this disclosure.

Figure 8:
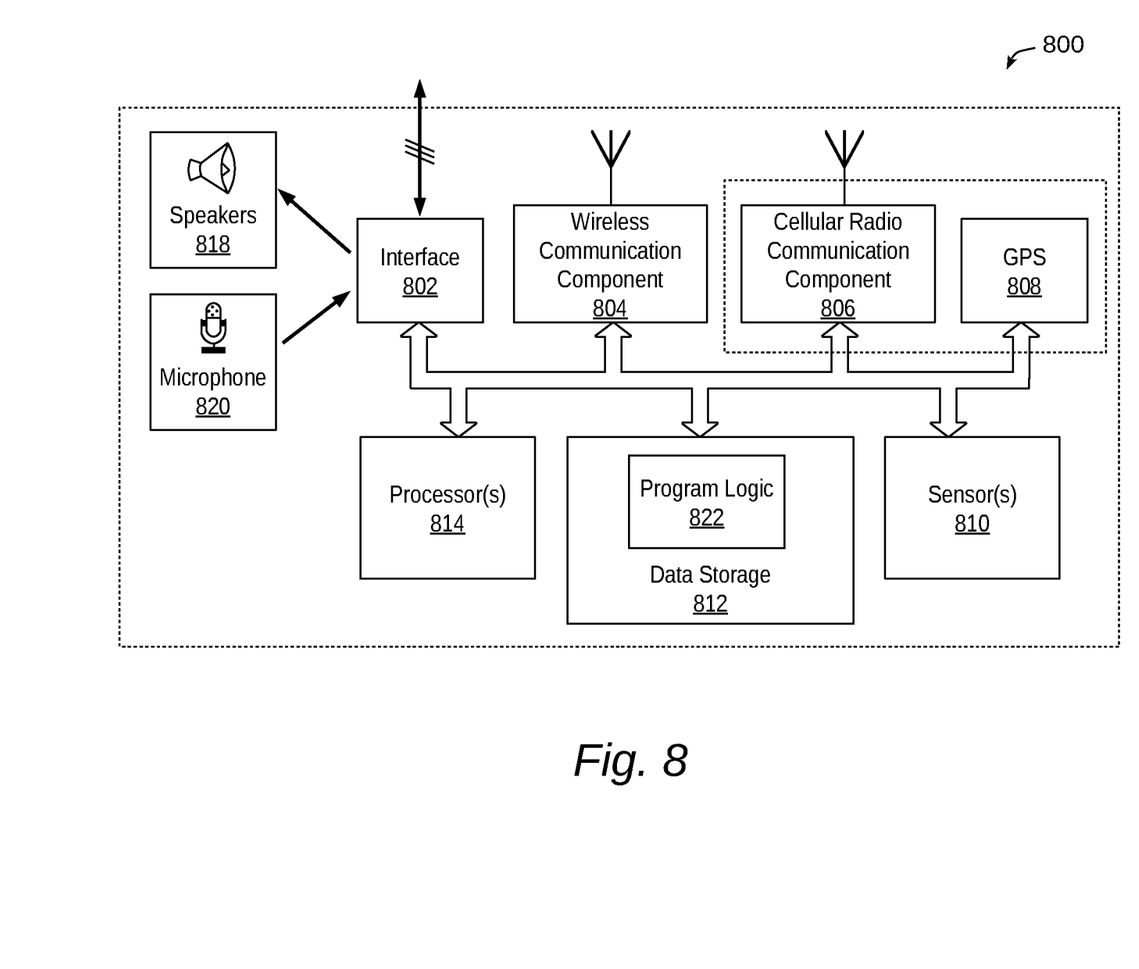
FIG. 8 is a functional block diagram of an illustrative computing device that may be used in implementations of this disclosure.

By way of example, FIG. 8 illustrates an example computing device 800. In some examples, components illustrated in FIG. 8 may be distributed across multiple computing devices. However, for the sake of example, the components are shown and described as part of one example computing device 800. The computing device 800 may be or include a mobile device (such as a mobile phone), desktop computer, laptop computer, email/messaging device, tablet computer, or similar device that may be configured to perform the functions described herein. Generally, the computing device 800 may be any type of computing device or transmitter that is configured to transmit data or receive data in accordance with methods and functions described herein.

The computing device 800 may include an interface 802, a wireless communication component 804, a cellular radio communication component 806, a global positioning system (GPS) receiver 808, sensor(s) 810, data storage 812, and processor(s) 814. Components illustrated in FIG. 8 may be linked together by a communication link 816. The computing device 800 may also include hardware to enable communication within the computing device 800 and between the computing device 800 and other computing devices (not shown), such as a server entity. The hardware may include transmitters, receivers, and antennas, for example.

The interface 802 may be configured to allow the computing device 800 to communicate with other computing devices (not shown), such as a server. Thus, the interface 802 may be configured to receive input data from one or more computing devices, and may also be configured to send output data to the one or more computing devices. The interface 802 may be configured to function according to a wired or wireless communication protocol. In some examples, the interface 802 may include buttons, a keyboard, a touchscreen, speaker(s) 818, microphone(s) 820, and/or any other elements for receiving inputs, as well as one or more displays, and/or any other elements for communicating outputs.

The wireless communication component 804 may be a communication interface that is configured to facilitate wireless data communication for the computing device 800 according to one or more wireless communication standards. For example, the wireless communication component 804 may include a Wi-Fi communication component that is configured to facilitate wireless data communication according to one or more IEEE 802.11 standards. As another example, the wireless communication component 804 may include a Bluetooth communication component that is configured to facilitate wireless data communication according to one or more Bluetooth standards. Other examples are also possible.

The cellular radio communication component 806 may be a communication interface that is configured to facilitate wireless communication (voice and/or data) with a cellular wireless base station to provide mobile connectivity to a network. The cellular radio communication component 806 may be configured to connect to a base station of a cell in which the computing device 800 is located, for example.

The GPS receiver 808 may be configured to estimate a location of the computing device 800 by precisely timing signals sent by GPS satellites.

The sensor(s) 810 may include one or more sensors, or may represent one or more sensors included within the computing device 800. Example sensors include an accelerometer, gyroscope, pedometer, light sensor, microphone, camera(s), infrared flash, barometer, magnetometer, Wi-Fi, near field communication (NFC), Bluetooth, projector, depth sensor, temperature sensor, or other location and/or context-aware sensors.

The data storage 812 may store program logic 822 that can be accessed and executed by the processor(s) 814. The data storage 812 may also store data collected by the sensor(s) 810, or data collected by any of the wireless communication component 804, the cellular radio communication component 806, and the GPS receiver 808.

The processor(s) 814 may be configured to receive data collected by any of sensor(s) 810 and perform any number of functions based on the data. As an example, the processor(s) 814 may be configured to determine one or more geographical location estimates of the computing device 800 using one or more location-determination components, such as the wireless communication component 804, the cellular radio communication component 806, or the GPS receiver 808. The processor(s) 814 may use a location-determination algorithm to determine a location of the computing device 800 based on a presence and/or location of one or more known wireless access points within a wireless range of the computing device 800. In one example, the wireless location component 804 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 800 may be determined.

In another instance, the processor(s) 814 may use a location-determination algorithm to determine a location of the computing device 800 based on nearby cellular base stations. For example, the cellular radio communication component 806 may be configured to identify a cell from which the computing device 800 is receiving, or last received, signal from a cellular network. The cellular radio communication component 806 may also be configured to measure a round trip time (RTT) to a base station providing the signal, and combine this information with the identified cell to determine a location estimate. In another example, the cellular communication component 806 may be configured to use observed time difference of arrival (OTDOA) from three or more base stations to estimate the location of the computing device 800.

In some implementations, the computing device 800 may include a device platform (not shown), which may be configured as a multi-layered Linux platform. The device platform may include different applications and an application framework, as well as various kernels, libraries, and runtime entities. In other examples, other formats or operating systems may operate the computing g device 800 as well.

The communication link 816 is illustrated as a wired connection; however, wireless connections may also be used. For example, the communication link 816 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 800 may include more or fewer components. Further, example methods described herein may be performed individually by components of the computing device 800, or in combination by one or all of the components of the computing device 800.

Many other uses and alternatives of the disclosure will become apparent from the foregoing teachings. In this detailed description, numerous examples have been set forth to provide a thorough understanding of the described embodiments. On the other hand, some well-known features have not been described in detail in order to not obscure the description.

A person skilled in the art in view of this description, taken as a whole, will be able to implement various preferred embodiments. However, the specific preferred embodiments disclosed and illustrated herein are not to be considered in a limiting sense. Indeed, it should be readily apparent to those skilled in the art that what is described herein may be modified in numerous ways. Such ways can include equivalents to what is described herein. In addition, embodiments may be practiced in combination with other systems. The following claims define certain combinations and subcombinations of elements, features, steps, and/or functions, which are regarded as novel and non-obvious. Additional claims for other combinations and subcombinations may be presented in this or a related document.

What is claimed is:

1. A privacy system, comprising:
   a service host implemented in a public network and having a secure network tunnel server and a domain manager, the secure network tunnel server being configured to receive a request to establish a secure network tunnel from a remote secure network tunnel client and to establish the secure network tunnel, the secure network tunnel having an endpoint at the service host and an origin at the remote secure network tunnel client, the domain manager being configured to create a domain name system (DNS) record that resolves a domain name to a public Internet Protocol (IP) address, the public IP address being associated with the secure network tunnel endpoint; and
   a secure server configured for deployment in a private network, the secure server being further configured to request a private IP address on the private network, the secure server further having the remote secure network tunnel client configured to initiate the secure network tunnel with the origin at the secure server,
   wherein the secure server is configured to establish the secure network tunnel between the secure server and the service host, and
   further wherein the service host is configured to cause traffic on the public network intended for the domain name to be routed to the secure server over the secure network tunnel.

2. The privacy system recited in claim 1, wherein the secure network tunnel server comprises a Virtual Private Network server.

3. The privacy system recited in claim 1, wherein the remote secure network tunnel client comprises a Virtual Private Network client.

4. The privacy network recited in claim 1, wherein the secure network tunnel comprises a Virtual Private Network tunnel.

5. The privacy network recited in claim 1, wherein the domain manager is configured to create a DNS "A" record that associates the public IP address with the domain name.

6. The privacy network recited in claim 1, wherein the public network and the private network are separated by a privacy boundary.

7. The privacy network recited in claim 6, wherein the privacy boundary comprises a gateway that implements Network Address Translation.

8. The privacy network recited in claim 1, wherein the secure server implements an email service, and wherein the service host is further configured to create an MX record that associates the domain name with the secure server.

9. The privacy network recited in claim 1, wherein the secure server implements a file synchronization service.

10. The privacy network recited in claim 1, wherein the domain manager is configured to modify DNS records for the domain name on behalf of a user that has provided authentication credentials.

\* \* \* \* \*